Dec. 11, 1934.   E. PEREMI ET AL   1,984,232
EXTRUDED SHAPES WITH INTERLOCK AND METHOD OF MAKING SAME
Filed Sept. 29, 1933
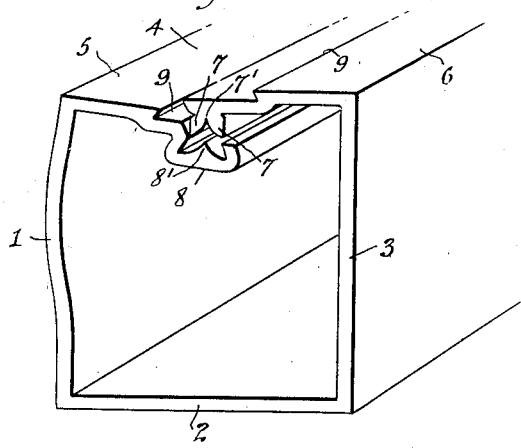
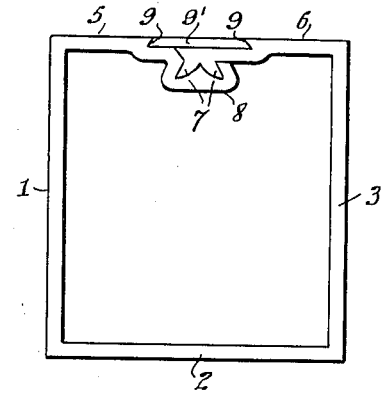
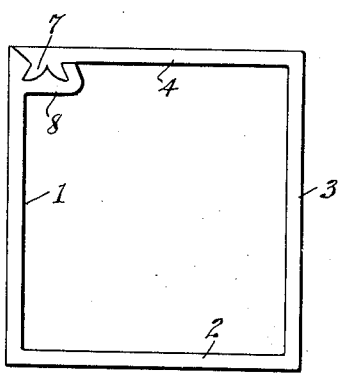
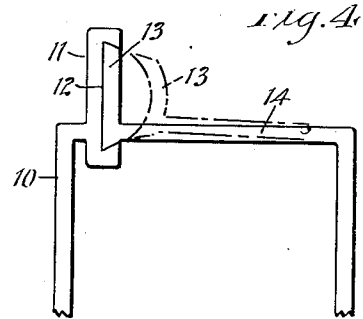
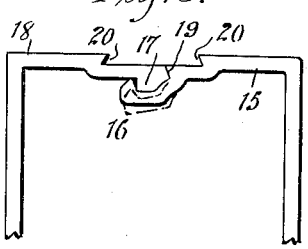
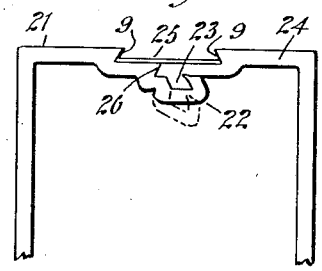
INVENTORS
Edmund Peremi
Louis Toth Patented Dec. 11, 1934

1,984,232

UNITED STATES PATENT OFFICE 1,984,232

EXTRUDED SHAPES WITH INTERLOCK AND METHOD OF MAKING SAME

Edmund Peremi and Louis Toth, Manhasset, N. Y.

Application September 29, 1933, Serial No. 691,556

6 Claims. (Cl. 189—41)

This invention relates to the manufacture of extruded structural elements of various cross sectional shapes, and has particular reference to tubular elements and the method of making the same. It is a well known fact that it is difficult to extrude tubular elements of any appreciable length, and it is the purpose of our invention to provide a shape which can be extruded of any desired length and separate portions thereof secured together by improved interlocking means.

A further object is to provide a joint of this character which includes a mortise and tenon coupling with the mortise expansible in the tenon so as to form a rigid, secure juncture.

The invention, therefore, has particular reference to the interlocking means and the method of interlocking, all of which will be more fully hereinafter described and pointed out in the claims.

In the accompanying drawing,—

Figure 1 is an end view projected in perspective, illustrating one form of the invention before the joint is closed;

Figure 2 is an end view showing the joint illustrated in Figure 1 closed;

Figure 3 is a view similar to Figure 2 illustrating a modification; and

Figures 4, 5 and 6 are fragmentary end views illustrating other modifications.

Throughout the drawing, tubular elements or sections of general rectangular shape in cross section are shown but, of course, it is understood that the invention is not limited to a particular shape but can be used of any shape of tubular type, but the rectangular shape will illustrate the invention and shall be hereinafter described.

It is to be understood that the various elements will be made of metal having the desired modulus of resiliency, expansibility and bendability.

Referring more particularly to Figures 1 and 2 of the drawing, the four walls of the tubular construction are indicated generally by the reference characters 1, 2, 3 and 4. The wall 4 has two longitudinal parts 5 and 6, which are spaced apart during the extruding process and which are secured together by our improved joint. The section 6 is made with an internal longitudinally extending expansible tenon 7, and the section 5 has a longitudinally extending dove-tailed mortise 8 into which the tenon 7 is positioned, and when pressed downwardly in the mortise or when the mortise is pressed upwardly onto the tenon, the tenon will be expanded in the dove-tail of the mortise and form a secure interlock. To insure the proper expansion of the tenon, the mortise has a double curved wedge 8' in its central portion which enters a longitudinal groove 7' in the tenon. Furthermore, as a securing interlocking means the sections 5 and 6 are formed in their outer faces with longitudinal grooves or recesses 9 which, when the mortise and tenon are interlocked, constitute a dove-tailed recess for the accommodation of any suitable interlocking member or means, such as a strip 9' which is sweated in with soft solder.

Figure 1 illustrates the device as it comes from the extruding apparatus, and Figure 2 illustrates the same after the mortise and tenon interlock, as above explained.

In Figure 3 of the drawing, the same general idea of joint may be carried out, with the exception that the joint is at one corner of the tubular device and not at the center of one of its walls, and as the construction otherwise is the same, with the exception of the outer recesses 9 in Figure 1, like reference characters are employed in Figure 3 indicating parts like those illustrated in Figures 1 and 2.

In Fig 4 a modified form of joint is illustrated in which one wall 10 of the extruded shape is provided with an enlargement 11 having a dove-tailed recess 12 therein to receive a dove-tailed tenon 13 on another wall 14. This tenon 13 when extruded is curved transversely, as indicated in dotted lines in Figure 4 of the drawing, so as to reduce its width, and when this curved tenon is positioned in the mortise 12 and flattened out it will interlock and fit the mortise, as clearly indicated.

In Figure 5 of the drawing, a modified form of joint is illustrated in which a wall section 15 carries a longitudinal mortise 16 to receive a longitudinal tenon 17 on another wall section 18. The mortise and tenon are somewhat step shaped and there is an inclined juncture wall 19 between the mortise and tenon so that the mortise must be slightly expanded to receive the tenon and then bent against the same to secure the tenon therein.

In this modified form illustrated in Figure 5, longitudinal recesses 20 are provided in the outer faces of the wall sections which, when together, form a dove-tailed recess similar to that indicated in Figures 1 and 2 of the drawing.

Figure 6 illustrates another modification of the invention, in which the wall section 21 has a mortise 22 to receive a tenon 23 on another wall section 24, and the mortise and tenon have a double step formation with the grooved portions 9 in the outer face of the wall section receiving a locking strip 25, and a soft solder or securing flux may be poured into this recess around and under the strip 25 to secure a fixed juncture of the parts.

In the modification shown in Figure 6, like Figure 5 there are inclined juncture walls 26 between the mortise and tenon members which require bending of the mortise members to secure the same around the tenon, and in all forms of the interlock either the mortise or the tenon must expand, contract or be otherwise bent to secure the interlocking of the wall sections together. Furthermore, it will be noted that all of the mortise and tenons forming the joint are angular in cross section and have inclined interlocking walls, as distinguished from circular or round joints; thus a superior joint is had than would be the case if rounded members were interlocked.

In operation, the open tubular shapes are extruded through a suitable die to give the desired shape to form an angular mortise and tenon securing means, and after extrusion the angular mortise and tenon members are secured together in interlocking relation so as to insure the closing of the shape to form a tubular member which is as strong and durable as if the parts were integral.

While we have illustrated what we believe to be the preferred embodiment of our invention, it is to be distinctly understood that various slight changes may be made with regard to the form and arrangement of parts without departing from our invention, and hence we do not limit ourselves to the precise details set forth but consider ourselves at liberty to make such changes and alterations as fairly fall within the spirit and scope of the claims.

What we claim is:

1. A structural element consisting of a strip of metal shaped in tubular form having two longitudinally extending edges adjacent each other, one of said edges having a longitudinally extending dove-tailed mortise, and the other edge having a longitudinally extending expansible tenon, a joint being formed between said edges by the tenon being expanded in said mortise.

2. A structural element consisting of a strip of metal shaped in tubular form having two longitudinally extending edges adjacent each other, one of said edges having a longitudinally extending dove-tailed mortise, the other edge having a longitudinally extending expansible tenon, a joint being formed between said edges by the tenon being expanded in said mortise, said edges also being formed to provide a dove-tailed recess when they are joined as aforesaid, and a dove-tailed strip received in said recess to prevent opening of said joint.

3. A structural element consisting of a longitudinal strip extruded in tubular form with two longitudinal edges connected by a dove-tailed mortise and tenon joint, said joint providing a dove-tailed recess, and a dove-tailed strip positioned in said recess to lock said joint.

4. A structural element consisting of a longitudinal strip extruded in tubular form with two longitudinal edges, an enlargement on one of said edges with a dove-tailed recess therein, and a normally curved tenon on the other edge adapted to be positioned in said recess and when flattened to interlock in the recess to form a joint between said edges.

5. A structural element consisting of a longitudinal strip extruded in tubular form with two longitudinal edges, one of said edges having a longitudinal dove-tailed mortise with a longitudinal wedge disposed centrally therein, the other edge having a longitudinal tenon with a groove therein to receive the wedge, so that when said mortise and tenon are forced together the tenon will be expanded in the mortise.

6. The herein described method of making a tubular structural element, which consists in extruding a longitudinal strip to provide a dove-tailed interlocking angular mortise and tenons adjacent each other adapted to be forced together to interlock adjacent longitudinal edges of the strip.

EDMUND PEREMI.
LOUIS TOTH.